J. P. TARBOX.
METHOD OF AND APPARATUS FOR BALANCING AIRCRAFT.
APPLICATION FILED AUG. 15, 1912.
1,201,647.
Patented Oct. 17, 1916.
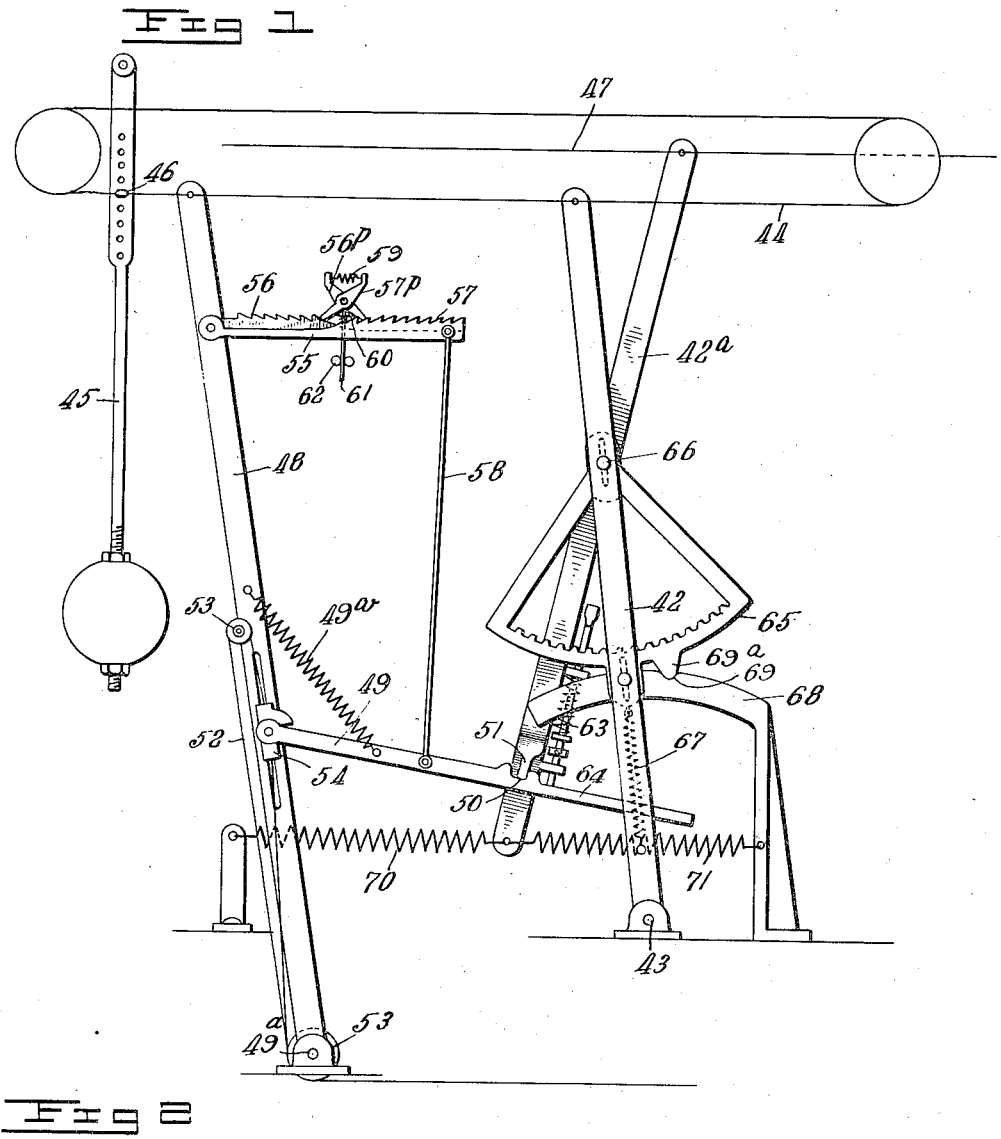
Fig 1
Fig 2
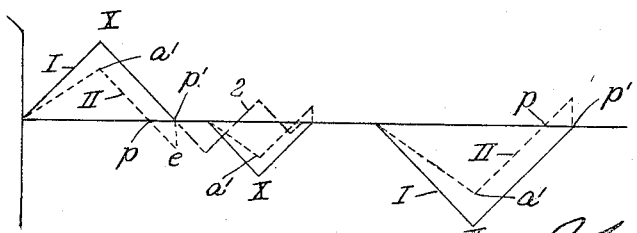
Witnesses
Inventor

UNITED STATES PATENT OFFICE.

JOHN P. TARBOX, OF WASHINGTON, DISTRICT OF COLUMBIA.

METHOD OF AND APPARATUS FOR BALANCING AIRCRAFT.

1,201,647.

Specification of Letters Patent.

Patented Oct. 17, 1916.

Application filed August 15, 1912. Serial No. 715,276.

*To all whom it may concern:*

Be it known that I, JOHN P. TARBOX, a citizen of the United States, residing at Washington, District of Columbia, have invented a new and useful Improvement in Methods of and Apparatus for Balancing Aircraft, of which the following is a specification.

The method of my invention is capable of universal practice. In other words it may be applied to any known type of aircraft. So also it may be practised in connection with any known type of automatic balancing mechanism, without radical changes of the mechanism itself, though this may be done if desired.

By way of preliminary definition the method of my invention may be said to be the operating of the balancing devices of an aircraft from normal automatically to correct each unbalancing of the craft, automatically returning the balancing devices to normal prior to the return of the craft to normal, thereupon before the craft reaches normal position automatically operating the balancing devices in the reverse direction to check the momentum of the craft as it arrives at normal, and thereafter returning the balancing devices to normal. Additional and coöperating features of my invention are initially operating the devices from normal a degree substantially proportional to the degree of unbalancing of the craft, operating them on the reverse movement from normal immediately following their return to normal, a degree in each case, though less than the initial forward movement, substantially proportional to the degree of unbalancing, finally returning the balancing devices to normal by a sudden and quick movement substantially instantaneous. My method is capable both of broader, and more specific definition as will appear.

For carrying out the method of my invention I have devised several forms of apparatus. That one which I shall use herein to illustrate the method of my invention is a balancing mechanism comprising an operating means for balancing devices and a standard of position for controlling the same, the said operating means being a reversible slow forward and fast return movement. It imparts to the balancing devices slow movement from normal and fast movement returning to normal. Means are provided to release the balancing devices from the operating means when the craft reaches normal, and also for at this time reversing the movement. This mechanism is shown in the accompanying drawings of which:

Figure 1 is a diagrammatic view showing the mechanism in elevation. Fig. 2 is a curve diagram showing the deflections of the craft on unbalancing and the corresponding deflection of the balancing devices.

The operating mechanism of my invention for the sake of simplicity is shown connected with a simple pendulum as illustrative of any type of balancing mechanism. The use of the method of my invention in connection with the simple pendulum however, is productive of important results as will appear. Of course the servo motor mechanism of any known form, or any other balancing mechanism may be substituted for the pendulum if desired.

42 is one of a pair of differential levers 42, 42ª, is pivoted at one end to a fixed point 43, and at its upper end connected with cord 44, which cord is operated back and forth by the simple pendulum balance 45. The pendulum is adjustably connected with the cord so that the degree of movement it imparts to the cord upon any unbalancing is adjustable. Pin 46 connecting with the cord may simply be moved from one hole to another, or equivalent means may be used. Lever 42ª is pivotally connected with lever 42. Its upper end is connected by cord 47 to the balancing devices of the craft. Its lower end is governed in its movements by an auxiliary lever 48.

Like lever 42, lever 48 is pivoted at its lower end to a fixed point, (49ª) and connected at its upper end to cord 44. But lever 48 is preferably somewhat longer than lever 42 and is spaced some distance from it. Connected with lever 48 by pin, block and slot connection is a transversely extending link 49, the outer end of which is provided with a slot 50 made by upwardly projecting walls, the outer sides of which are sloping. A lug or tooth 51 on the lower end of lever 42ª normally engages in this slot, the link being biased upwardly by spring 49ª connecting with lever 48. The inner end of link 49 is adjustable up and down on member 48 by means of the cords 52 extending over pulleys 53 and connecting with block 54. A second link 55 is pivotally connected with lever 48 above link 49, connected above in order to make use of the greater movement of lever 48 nearer its upper end. Link 55 is provided with two sets 56 and 57 of ratchet teeth one at each end and pointed in opposite directions. The two sets are out of line with each other and each terminates near the center in a depressed portion free from teeth, the toothed portions overlapping a small distance at the center. At its outer end link 55 is connected to link 49 by link 58. Connected to a fixed point about its middle are two coöperating pawls 57$^p$ and 56$^p$ normally biased toward each other by spring 59, and kept apart by intervening lug 60. Lug 60 however is movable about the pivot of the pawls and is connected rigidly with leaf spring 61, which depends between two fixed pins 62, and normally centers the pawls as shown. The teeth of the link 55 and the pawls may be varied in form and proportion and suitable lost motion introduced without departing from my invention.

Coöperating with the inner end of the lower link 49, is a spring latch 63 mounted on lever 42$^a$ in position to be engaged by the extension 64, from link 49. The latch 63 is adapted to engage and lock with an arc shaped rack 65 carried by lever 42 and concentric with pivotal point 66. This rack is movably mounted on lever 42 by pin and slot connections as shown and is biased downwardly and away from latch 63 by means of spring 67, but controlled in its position by cam 68 fixed in position substantially concentric with lower pivot 43 and provided with a notch 69 in which point 69$^a$ on rack 65 normally engages. Springs 70 and 71 bias the lever 42$^a$ to a defined normal position.

In operation when the cord 44 is moved to the left, both levers 42 and 48 are also moved to the left, as is also lever 42$^a$ by levers 42 and 48. But lever 42$^a$ is moved to the left (at its upper end) a less degree than lever 42, because as lever 42 carries its upper end over, lever 48 through the link 49 carries over its lower end, thereby giving rise to a clockwise movement of lever 42$^a$ about pivot 66, with the result that the balancing devices through cord 47 are moved to a less degree than if connected directly to cord 44. How much less is determined by adjusting the pivotal connection 54 of the link 49 on lever 48. This may be done from a distant point by cords 52, suitable connection being also made to move pawls 56$^p$ and 57$^p$ with link 55.

Now it is readily seen that for the best results and for the most compact construction lever 42$^a$ should normally overlie lever 42, that lug 51 on lever 42$^a$ should normally lie opposite fixed pivot 43, and that link 49 should extend substantially horizontally from point 43. Nor need lever 48 be far removed laterally from levers 42 and 42$^a$. In this way the whole mechanism may be compacted. It is shown in the extended diagrammatic form for the purpose of clarity and simplicity of illustration.

During the time the levers move to the left the pawl 57$^p$ engages and ratchets over rack 57. Also the rack 65 has been raised into position to be engaged by latch 63 by the riding of point 69 on the surface of cam 68. When the movement to the left ceases and the movement to the right ensues upon response of the craft to the corrective force of the balancing devices, the pawl 57$^p$ tends to prevent right hand movement of link 55, being pointed against it, with the result that the pawl is moved by the rack 57 about its pivot, and that the link 55 is forced downwardly, the pawl 57$^p$ simply ratcheting over the rack 57 in the reversed direction being held to the rack by the now flexed spring 61. As aforesaid the relative shape of the teeth of rack 57 and pawl 57$^p$ may be modified if desired to facilitate this action, as by rounding the points and corners of each. The downward movement of link 55 through link 58 is communicated to controlling link 49 which is disengaged from tooth 51 of lever 42$^a$, suitable play being provided in notch 50 if desired and as indicated to effect this disengagement before lever 42$^a$ has been moved, but this is not essential. Disengagement of link 49 instantly frees latch 63 which engages and locks with rack 65 preferably just before tooth 51 has been freed. Thus lever 42$^a$ is locked to lever 42 in its displaced position and during the remainder of the return movement of lever 42, the upper end of lever 42$^a$ is moved through an angular distance equal wholly to that of lever 42, (and not a less distance as on the forward movement), whereby the balancing devices are moved back to normal and past it establishing a checking force in the opposite direction to check the craft as it comes to normal and stop it precisely there. When the lever 42 reaches normal, the point 69$^a$ slips into its notch on cam 68 and rack 65 disengages itself from latch 63, whereupon springs 70, 71 draw lever 42$^a$ which is now to the right of lever 42, suddenly back to normal position and with it the balancing devices. Lever 48 is also back at normal at this time, being moved synchronously with 42, and hence notch 50 is in position to receive tooth 51 which slips over the side walls of the notch and into it. And in the normal position 55 presents a depressed portion to each pawl 56$^p$, 57$^p$ with the result that the pawls are freed at normal, and are returned to normal, link 55 moving upwardly with link 49 under the bias of spring 49$^a$. Suitable play may be provided for pawls 56$^p$, 57$^p$, and the relative length and positions of the racks 56, 57 and the adjoining depressed portions may be varied to provide any desired lost motion necessary for accurate action. Unbalancing movement in the opposite direction produces opposite movement of all the parts and is characterized by the operation of pawl 56p and rack 56 instead of pawl 57p and rack 57. Clearly this reverse checking movement of the balancing devices is equal to the difference between the entire forward movement and the entire return movement of the upper end of lever 42, is furthermore equal to the amount of "let off movement" determined by lever 48, is adjustable through shifting of block 54, and because lever 48 is moved directly by the pendulum or other balancing mechanism, this checking movement and therefore the force, is substantially proportional to the unbalancing movement of the craft. Thus the greater the moment gathered by the craft returning to normal the greater the checking force, as it should be. All this is clearly shown by the curves of Fig. 2, the full line curves I showing successive unbalancing of the craft and the dotted line curves II the correcting forces established by the balancing devices. For each unbalancing of the craft on either side of the normal line it will be noted that there is an excursion of the balancing devices on the same side of normal to establish the corrective force and then before the craft reaches normal an excursion on the opposite side substantially proportional in each case to the degree of unbalancing to establish the checking force. In each case, it is to be noted that the method involves accurate relation of the time of unbalancing to the resulting corrective forces set up.

In the forward movement, the balancing devices are at all times deflected, a distance proportional to the deflection of the craft in unbalancing. On the return movement, however, the balancing devices are returned toward normal at a greater pace than the craft with the result that the checking force is set up as specified. Furthermore, the checking force is set up always at a predetermined point in a return movement. Say, for instance, at the two-thirds point, therefore, if the return to normal is regular, this means that the checking force is always set up when the time of the return movement has approximately reached two-thirds of its total.

It is the slow forward movement of member 42a and fast return, with the resulting greater return movement, etc., which carries into effect on the balancing devices the method of my invention. When the balancing devices are connected to member 42, as by means of cord 47 and unbalancing of the craft occurs the result on the balancing devices is as shown in Fig. 2. Fig. 2 is a curve drawn between time as abscissæ and deflection of the aircraft and the resulting deflection of the balancing devices as ordinates. The full line curve is the curve representing the degree and time of unbalancing of the craft. It proceeds upon substantially straight lines, though upon occasion it may be somewhat different, reaching a maximum point of deflection X and then returns to normal under the action of the balancing devices. Under the methods of balancing at present practised the craft may possibly stop at normal on its return movement due to a lucky strike of judgment if manual control is being used, but in the great majority of instances passes normal in the reverse direction as shown by the dot and dash continuation of curve I, giving rise to a rocking of the craft. And under automatic methods of balancing this rocking has been found always to be present, the craft gradually settling down to normal after each unbalancing. In moderate weather this is scarcely perceptible, but in more severe and gusty weather the phenomena is marked both with manual and automatic control. The reason for this action is found in the varying conditions of the atmosphere, the mass of the air craft which gives rise to inertia in movement, the impossibility of the human mind and skill to gage the severity of the disturbing atmospheric conditions and the resulting inertia moment of the craft, and the inability of former automatic devices to perform these functions by inherent action in response to unbalancing. Under rapidly varying unbalancing of the craft the balancing devices are rarely moved by the manual operator just to the right degree, being moved too much or too little, with an over correction in the one case or an under correction in the other. And even when moved just the correct degree, as in all other cases the craft nearly always overrides her normal position and has to be brought back by a subsequent movement. This latter is due to the momentum of the craft gathered on its return movement perhaps more than to misjudgment. It is particularly true of aircraft equipped with former balancing mechanisms operating on the old methods. And finally it may be said that it is particularly true of manual control that there are perhaps no operators who can or do accurately and uniformly relate the operation of the balancing devices to the time of the cycle of unbalancing movement of the craft. By many the balancing devices are operated entirely in quick instantaneous jerks both forward and return. This method as often fails to bring the craft up to normal, as it does carry it past normal. Necessarily the result of all of these varied and varying factors, the craft not only oscillates about the normal position, but is not infrequently retarded in settling down at normal.

Now referring again to the practice of my invention and having again particular reference to Fig. 2, it will be seen, that when the balancing devices of the craft are operated through the means of my invention, being connected with the lever 42$^a$, upon each unbalancing they are operated degree for degree (proportionately) with the craft as it becomes unbalanced, following the dotted line curve II of Fig. 7, until the craft reaches its position of maximum unbalancing X, at which time or a trifle later the balancing devices will have reached their maximum position $a'$. Thus a corrective force has been set up proportional approximately to the degree of unbalancing. Thereupon the movement of lever 42$^a$ by the mechanism ceases and immediately reverses as the craft responds to the corrective force of the deflected balancing devices. This is also true when a servo motor is used instead of the pendulum. The balancing devices are thereby reversed but reverse movement is at a faster speed than the forward movement being determined wholly by lever 42. Since lever 42 as usual is moved through the same distance returning to normal that it was moved forward from normal, the result is that before the craft reaches normal, the balancing devices, returning at faster speed, reach their normal position and pass it thus setting up a checking force in the reverse direction from the corrective force at $a'$ whereby the momentum of the craft is checked and it stops at normal. At this time the balancing devices have reached position $e$ (Fig. 2) on the opposite side of normal. Immediately, due to tooth 69$^a$ slipping into the notch on cam 68, lever 42$^a$ is released from rack 65 and returned to normal by wind pressure on the balancing devices, the springs 70—71 or both together, and with it the balancing devices, the checking force being thus suddenly and instantaneously removed exactly at the right time, the craft then standing at normal as shown by Fig. 2. The result is that the craft returns by smooth and even movement precisely to normal position from each unbalancing and stops precisely there without jar or rocking of any kind, for all of the fact that the cycle of operations just traced takes place in not much more than an instant of time, and at most not more than a second or two. With this understanding, analysis of the movements of the mechanism used in the practice of my invention, will reveal its refinements most clearly. The forward movement of lever 42 from normal is always, due to its direct connection with the pendulum or other motor mechanism, substantially proportional to the degree of unbalancing. Its return to normal movement is substantially equal always to its forward movement. Therefore the movement of lever 42$^a$ though less in degree than that of lever 42, and though greater in degree on the return movement than on its forward movement is also substantially proportional on both forward and return movements to the degree of unbalancing of the craft. And this being true, the difference between the forward movement of lever 42$^a$ and the return movement, which difference brings about the reverse movement of the balancing devices and establishes the checking force, is also in each case substantially proportional to the degree of unbalancing of the craft. This is as it should be, and by varying the relative proportions of the levers used the size of the checking force (and the difference between the forward and return movements of lever 42$^a$) may be made greater or smaller as desired. Furthermore, by varying also the degree of movement of the lever 42$^a$ from lever 42, the ratio of the checking force to the corrective force (set up by the balancing devices in their positions of maximum deflection) may be made anything desired. Movement of lever 42 may be varied by simply adjusting the connection between it and the standard of position or in case a servo motor is used by simply adjusting the follow up connection between the standard of position used and the servo motor. Such a means of adjusting the follow up connection is shown in my co-pending application Serial No. 660,249 filed November 14, 1911. Thus while the method of my invention is in itself most definite, it is yet so flexible in its operation as to permit adjustment of the controlled forces to meet any desired conditions, and is therefore capable of use on any type of air craft, no matter what the difference in the balancing characteristics and factors.

It has been stated that the method of my invention has particular value when used in connection with a simple pendulum. The reason for this is that by the checking force set up according to my invention, the tendencies of the pendulum to oscillation and cumulative oscillation, which have made the simple pendulum inoperative heretofore, are absolutely annulled.

By the term "standard of position" used herein and in the annexed claims, I mean any automatically acting primary control element governing or controlling in any way the angular position of the plane of the craft with respect to the horizontal plane or the surface of the earth.

While I have described the best apparatus which is now known to me for carrying my invention into practice I want it clearly understood that my invention is capable of embodiment in many forms without departing in any wise from its generic support. I therefore, intend to cover in the annexed claims all such forms of my invention.

What I claim is:

1. The method of balancing an air craft which consists in setting up a checking force bearing a uniform ratio to the corrective force used during any unbalancing of the craft irrespective of the rate of return of the craft to normal position, by progressively increasing said force to its maximum from a point of inception until the craft approximately reaches its normal position, and thereupon removing said checking force.

2. The method of balancing aircraft which consists in automatically setting up corrective forces in each case as the craft moves from normal, automatically removing said forces prior to the return of the craft to normal, and thereupon before the craft reaches normal position automatically setting up checking forces in the reverse direction and of a degree invariably approximately proportional to the maximum degree of unbalancing of the craft, and automatically removing said checking forces as the craft arrives at normal position.

3. The method of balancing aircraft which consists in automatically setting up corrective forces as the craft moves from normal to correct each unbalancing of the craft, automatically removing said forces prior to the return of the craft to normal, and thereupon before the craft reaches normal position automatically setting up checking forces in the opposite direction to check the return movement of the craft as it arrives at normal, and thereafter invariably suddenly removing said checking forces by an approximately instantaneous action as the craft arrives at normal position.

4. The method of balancing aircraft which consists in automatically setting up corrective forces in each case as the craft moves from normal and of a degree invariably approximately proportional to the degree of unbalancing, automatically removing said forces prior to the return of the craft to normal, and thereupon before the craft reaches normal position automatically setting up checking forces in the reverse direction and of a degree invariably approximately proportional to the degree of unbalancing of the craft, and automatically removing said checking forces invariably by an approximately instantaneous action as the craft arrives at normal position.

5. The method of automatically operating balancing devices upon balancing of a craft which consists in automatically establishing a lead of the balancing devices over the craft in cyclical movement during the period of the recovery of the balance thereof, thereafter continuing the established lead until the craft has substantially recovered its balance, whereby movement of the balancing devices in the reverse direction from normal takes place as the craft approaches normal position and its movement is checked at normal, and destroying the established lead as the craft reaches normal position.

6. The method of balancing an air-craft which consists in setting up a momentum checking force as the craft is returned to normal under the influence of corrective forces, and of a value bearing a uniform ratio to the corrective force used during any unbalancing of the craft, and independent of the rate of return of the craft to normal position, and removing said force before it may become effective to again unbalance the craft.

7. The method of balancing an air-craft which consists in setting up a momentum checking force as the craft is returned to normal under the influence of corrective forces, and of a value bearing a determinate ratio to the corrective force used during any unbalancing of the craft, and independent of the rate of return of the craft to normal position, and removing said force before said craft substantially passes normal position.

8. The method of automatically operating balancing devices upon the unbalancing of a craft which consists in establishing a lead of the balancing devices over the craft in cyclical movement from normal position when the craft becomes unbalanced, maintaining said lead substantially until the craft approximately reaches its normal position, whereby movement of the balancing devices in the reverse direction from normal takes place just before the craft reaches its normal position upon recovery from an unbalancing, and destroying said lead after the reverse movement has taken place.

9. An automatic balancing mechanism comprising operating means for balancing devices governed by a standard of position, and means arranged to vary the relative extent of obverse and reverse movements of the balancing devices upon any unbalancing interpolated between said standard of position and said operating means.

10. An automatic balancing mechanism comprising balancing devices, a standard of position for governing the actuation of said balancing devices, and operating mechanism between said standard of position and said balancing devices imparting to said balancing devices obverse and reverse movements upon each movement of the craft from a determinate normal position, and a movement modifying device set during an obverse movement of said mechanism and modifying the action of said mechanism during reverse movement thereof, in accordance with said setting.

11. An automatic balancing system for aircraft comprising balancing devices a standard of position controlling the actuation thereof, variable ratio transmitting mechanism intermediate said standard of position and said balancing devices, and a means actuated through the initial operation of said mechanism to vary the ratio of transmission during subsequent operation whereby the movement of the balancing devices to different extents is produced according to the stage of their operation.

12. An automatic balancing system for aircraft comprising balancing devices, a standard of position controlling the actuation thereof, a variable ratio transmitting mechanism intermediate the standard of position and said balancing devices, and having a determinate normal ratio of transmission, means actuated through the initial operation of said mechanism to vary the ratio of transmission for subsequent operation, whereby movement of the balancing devices to different extents is produced according to the stage of their operation, and a restoring device actuated through return of the craft toward normal position to restore the normal ratio of transmission.

13. A balancing system for aircraft comprising balancing devices, a standard of position controlling the actuation thereof, and a differential transmitting mechanism intermediate the standard of position and said balancing devices, one element of which is operative uniformly during actuation of the balancing devices and the other element of which is actuated variably during the same operation.

14. The method of balancing aircraft which consists in (1) setting up a corrective force upon unbalancing bearing determinate normal proportion to the degrees of unbalancing, (2) removing the corrective force in a determinately greater proportion than the determinate normal proportion pertaining during establishment whereby a checking force is set up in a direction counter to the corrective force, and (3) removing the checking force so set up before it may operate to again unbalance the craft in the same direction.

15. The method of balancing aircraft which consists in setting up a momentum checking force as the craft is returned to normal under the effect of corrective forces and of a value bearing a determinate ratio to the corrective force used during the unbalancing of the craft according to the degree of unbalancing, and suddenly removing said checking force as the craft reaches its normal position.

16. A balancing system of the character described comprising balancing devices, a standard of position governing the same, control transmitting mechanism comprising primary and secondary transmitting elements, and actuating means for the secondary element controlled through actuation of the primary element.

17. A balancing system of the character described comprising balancing devices, a standard of position governing the same, control transmitting mechanism comprising primary and secondary transmitting elements, actuating means for the secondary element controlled through actuation of the primary element, a locking device to hold the secondary element in actuated position, and a releasing means for the secondary element also controlled through actuation of the primary element.

18. A balancing system of the character described comprising balancing devices, a standard of position governing the same, control transmitting mechanism comprising primary and secondary transmitting elements, actuating means for the secondary element controlled through actuation of the primary element, an additional actuating means for the secondary element independent of the primary element.

19. A balancing system of the character described comprising balancing devices, a standard of position governing the same, control transmitting mechanism comprising primary and secondary transmitting elements the secondary element of which has its range of movement predetermined by movement of said primary element, and actuating means for said secondary element independent of said primary element.

20. A balancing system of the character described comprising balancing devices, a standard of position governing the same, and control transmitting mechanism including a primary transmitting element arranged to directly effect control of said balancing devices by said standard, and a secondary transmitting element arranged to modify the transmission of the primary element but having a range of operation predetermined by operation of said primary element.

JOHN P. TARBOX.

Witnesses:
James H. Marr,
Chas. S. Grumman.